United States Patent
Minorics

(10) Patent No.: US 10,155,475 B1
(45) Date of Patent: *Dec. 18, 2018

(54) AUTONOMOUS VEHICLE DUAL TRAFFIC REFLECTOR DETECTOR

(71) Applicant: EASTON SCIENTIFIC, INC., Easton, PA (US)

(72) Inventor: Richard T. Minorics, Easton, PA (US)

(73) Assignee: EASTON SCIENTIFIC, INC., Easton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/732,615

(22) Filed: Dec. 4, 2017

(51) Int. Cl.
| | |
|---|---|
| G02B 5/04 | (2006.01) |
| B60Q 1/46 | (2006.01) |
| B60Q 1/52 | (2006.01) |
| B60Q 1/34 | (2006.01) |
| G05D 1/00 | (2006.01) |
| G08G 1/16 | (2006.01) |

(52) U.S. Cl.
CPC .............. B60Q 1/46 (2013.01); B60Q 1/34 (2013.01); B60Q 1/525 (2013.01); G05D 1/0088 (2013.01); G08G 1/166 (2013.01); G08G 1/167 (2013.01); B60Q 2300/41 (2013.01); B60Q 2300/42 (2013.01); B60Q 2300/45 (2013.01)

(58) Field of Classification Search
CPC ..... G02B 5/0289; G02B 5/045; G02B 5/0816
See application file for complete search history.

(56) References Cited

U.S. PATENT DOCUMENTS

| | | | | |
|---|---|---|---|---|
| 2,426,163 | A * | 8/1947 | Booth | G09F 13/16 359/527 |
| 3,814,500 | A * | 6/1974 | Ebenbichler | A01M 29/08 359/514 |
| 4,653,955 | A * | 3/1987 | Racs | E01F 9/553 116/63 R |
| 5,002,424 | A * | 3/1991 | Hedgewick | E01F 9/553 359/531 |
| 5,071,225 | A * | 12/1991 | Inoue | G02B 27/1006 359/589 |
| 5,277,516 | A * | 1/1994 | Strieter | A01M 29/08 404/14 |
| 5,449,244 | A * | 9/1995 | Sandino | E01F 9/553 404/14 |
| 5,842,765 | A * | 12/1998 | Cassarly | G02B 6/0006 362/21 |
| 6,147,806 | A * | 11/2000 | Park | G02B 27/1006 359/247 |

(Continued)

Primary Examiner — Hai Phan
Assistant Examiner — Son M Tang

(57) ABSTRACT

An autonomous vehicle dual traffic reflector device for detecting a second vehicle by a first vehicle, includes an outer array, said outer array having a plurality of colored light receiving-light transmitting lens, said outer array positioned in an arcuate arrangement having at least one focal point and said outer array having at least two caution-colored lenses; and an inner array positioned inside said outer array and between said outer array and a focal point of said at least one focal point of side outer array, said inner array positioned to receive light passing into said device through at least one lens and reflecting said light out of said device through at least one different lens. A system to guide such vehicles is also included.

20 Claims, 12 Drawing Sheets

(56) References Cited

U.S. PATENT DOCUMENTS

| | | | | |
|---|---|---|---|---|
| 6,267,530 B1 * | 7/2001 | Attar | ................. | E01F 9/553 |
| | | | | 404/14 |
| 6,334,734 B1 * | 1/2002 | Attar | ................. | E01F 9/573 |
| | | | | 404/12 |
| 6,461,022 B1 * | 10/2002 | Kreutzer | ............ | B60Q 1/2611 |
| | | | | 362/293 |
| D519,050 S * | 4/2006 | Lee | ................. | D10/113.1 |
| 8,169,311 B1 | 5/2012 | Breed | | |
| 9,014,953 B2 | 4/2015 | Breed et al. | | |
| 9,258,058 B2 | 2/2016 | Oshima et al. | | |
| 9,335,766 B1 | 5/2016 | Silver et al. | | |
| 9,652,985 B2 | 5/2017 | Myer | | |
| 2008/0030978 A1 * | 2/2008 | Hume | ................. | E01F 9/559 |
| | | | | 362/145 |
| 2013/0214121 A1 * | 8/2013 | Lee | ................. | G02B 27/40 |
| | | | | 250/201.4 |
| 2016/0011362 A1 * | 1/2016 | Jeng | ................. | G02B 6/006 |
| | | | | 362/606 |
| 2016/0132705 A1 | 5/2016 | Kovarik et al. | | |
| 2018/0058021 A1 * | 3/2018 | Lee | ................. | E01F 9/559 |

\* cited by examiner (Four Way Intersection)

AUTONOMOUS VEHICLE DUAL TRAFFIC REFLECTOR DETECTOR

REFERENCE TO RELATED APPLICATIONS

The present application is not related to any pending or issued United States of America or foreign patent or patent application.

BACKGROUND OF INVENTION a. Field of Invention

The present invention generally relates to reflector devices and systems involving these reflector devices. The present invention reflector devices have many applications, including ground guidance of airplanes, navigation guidance for waterways, roadway guidance and passive signaling and other advanced reflector applications. However, there is dire need for enhanced, accurate guidance systems with autonomous vehicles for lane maintenance and collision avoidance. On a macroscopic level, autonomous vehicle guidance relies upon satellite-based GPS systems that include triangulation and elevational readings. The accuracy, however, of the satellite-based GPS systems includes margins of error which sometimes result in autonomous vehicle collisions. Thus, the present invention is directed to, among other things, an accurate, ancillary guidance system that is locally positioned and locally accurate. Thus, the present invention autonomous vehicle dual traffic reflector detector has a plurality of lenses in an outer array and a plurality of reflective surfaces in an inner array so that light from a first vehicle will pass into the present invention reflector device, bounce off one or more reflectors and send a recognizeable beam of light back to a second vehicle (oncoming). This second vehicle will receive the light, such as a cautionary colored light, and with its onboard computer will determine angle and location and will make lane travel adjustments, as needed. The present invention not only includes the reflector device, but also includes systems using reflector devices in conjunction with autonomous vehicle traffic flow. In some cases, the present invention reflector detector device may be advantageous to warn drivers of unseen oncoming traffic and enable the drivers to make adjustments—slow down, stop, pull over, change lanes, etc.

b. Description of Related Art

The following patents are representative of the field pertaining to the present invention:

United States Patent No. 2016/0132705 A1 to Kovarik et al describes a method and system for facilitating cost effective, reliable, system redundant, self-driving vehicles that involves the employment of specialized lane marking components that permit unprecedented sensor feedback, and in particular, a system and method that enables accurate lane marking recognition despite adverse weather conditions, which presently pose problems experienced by self-driving systems that rely upon vision based camera systems.

U.S. Pat. No. 8,169,311 B1 to Breed describes a vehicle with wireless sensors including a frame, at least one sensor assembly fixed to the frame and each including a sensor arranged to obtain data about a condition or property of the vehicle or part thereof or an environment in or around the vehicle, and a wireless transmission component coupled to the sensor for wirelessly transmitting a signal derived from the data obtained by the sensor, a receiver fixed to the frame arranged to receive signals from the wireless transmission component, and a reactive component for performing an action based on the data obtained by the sensor and transmitted from the wireless transmission component to the receiver. The data can be displayed as an indication to the driver or other occupant of the vehicle, relayed the data to a remote location for analysis or response and/or used to determine adjustment or control a component in the vehicle.

U.S. Pat. No. 9,014,953 B2 to Breed et al describes a Wireless sensing and communication system including sensors located on the vehicle, in the roadway or in the vicinity of the vehicle or roadway and which provide information which is transmitted to one or more interrogators in the vehicle by a wireless radio frequency mechanism. Power to operate a particular sensor is supplied by the interrogator or the sensor is independently connected to either a battery, generator, vehicle power source or some source of power external to the vehicle. The sensors can provide information about the vehicle and its interior or exterior environment, about individual components, systems, vehicle occupants, subsystems, or about the roadway, ambient atmosphere, travel conditions and external objects. The sensors arranged on the roadway or ancillary structures would include pressure sensors, temperature sensors, moisture content or humidity sensors, and friction sensors.

U.S. Pat. No. 9,258,058 B2 to Oshima et al describes a signal transmitting apparatus that includes a light emitter and a circuit that controls the light emitter change in luminance in frequency to transmit a signal to a receiving apparatus. The receiving apparatus includes a processor and a recording medium having a program, the program causing the processor to execute operations. The operations include obtaining first image data with a first exposure time; setting a second exposure time of the image sensor so that, in an image obtained by capturing a subject by the image sensor, a plurality of bright lines corresponding to the plurality of exposure lines included in the image sensor appear according to a change in luminance of the subject; obtaining a bright line image including the plurality of bright lines; and obtaining information by demodulating data specified by a pattern of the plurality of bright lines.

U.S. Pat. No. 9,335,766 B1 to Silver et al describes a vehicle that may distinguish between dynamic obstacles and static obstacles. Given a detector for a class of static obstacles or objects, the vehicle may receive sensor data indicative of an environment of the vehicle. When a possible object is detected in a single frame, a location of the object and a time of observation of the object may be compared to previous observations. Based on the object being observed a threshold number of times, in substantially the same location, and within some window of time, the vehicle may accurately detect the presence of the object and reduce any false detections.

U.S. Pat. No. 9,652,985 B2 to Myer describes a vehicle guidance system (VGS) that facilitates interaction between human operated vehicles (HOV), autonomous driverless vehicles (ADV), and/or semi-autonomous vehicles, on the roadway, allowing safe interface with each other and with other elements, for example, weather conditions, traffic control systems, road conditions, obstructions that enter the roadway (people, rocks, animals, debris falling onto roadway from other vehicles), etc. The system provides guidance, communication, and control for the vehicles on the roadway, by using a solar-powered system comprising post assemblies having solar panel(s), sensors, forward and/or downward lighting, and other indicators/alarms to signal to the vehicle or driver regarding road, bridge, weather, accident, speeding, or other conditions of concern in the vicinity for safety and/or operability of the vehicle/driver(s).

Notwithstanding the prior art, the present invention is neither taught nor rendered obvious thereby.

SUMMARY OF INVENTION

The present invention is directed to an autonomous vehicle dual traffic reflector device for detecting a second vehicle by a first vehicle. It includes: a) an outer array, the outer array having a plurality of light receiving-light transmitting lens, the outer array positioned in an arcuate arrangement having at least one focal point and the outer array having at least two caution-colored lenses; b) an inner array of reflective mirrors positioned inside the outer array and between the outer array and a focal point of the at least one focal point of side outer array, the inner array of reflective mirrors positioned to receive light passing into the device through at least one lens and reflecting the light out of the device through at least one lens of the at least two caution-colored lenses. In other embodiments, the lenses could be clear, or combinations of clear and any colored lenses.

In some embodiments of the present invention reflector device, the arcuate arrangement is selected from the group consisting of closed loop and open loop.

In some embodiments of the present invention reflector device, the arcuate arrangement is selected from the group consisting of sinusoidal, arc of fixed radius, arc of varying radius, circle and polygon.

In some embodiments of the present invention reflector device, there are at least four lenses, each being in a different plane from the others.

In some embodiments of the present invention reflector device, there are at least three reflectors in the inner array, each in a different plane from the others.

In some embodiments of the present invention reflector device, there are four to twelve reflectors in the inner array, each in a different plane from the others.

In some embodiments of the present invention reflector device, the reflectors are flat reflectors.

In some embodiments of the present invention reflector device, the reflectors are curved.

In some embodiments of the present invention reflector device, the arcuate arrangement of the outer array is circular and the caution-colored lenses are colored selected from the color group consisting of red, orange, yellow and combinations thereof.

In other embodiments of the present invention, there is an autonomous vehicle dual traffic reflector detector system. It includes: a) a plurality of autonomous vehicles including a first autonomous vehicle and a second autonomous vehicle, each of the plurality of autonomous vehicles having a forward projecting light that includes vectors of light beams directed away from a lane of travel and light receiving sensors that recognize caution-colored light, including angle and distance, and including computer adjustment to lane positioning; b) a plurality of roadways having at least two lanes of travel, including a first lane for travel in a first direction and a second lane for travel in a second direction, the second direction being opposite the first direction, the roadways further including side areas outside of the first lane and the second lane; c) a plurality of autonomous vehicle dual traffic reflector devices for detecting a second the autonomous vehicle by the first autonomous vehicle located along the side areas of the plurality of roadways wherein each of the devices include: (i) an outer array, the outer array having a plurality of light receiving-light transmitting lens, the outer array positioned in an arcuate arrangement having at least one focal point and the outer array having at least two caution-colored lenses; (ii) an inner array positioned inside the outer array and between the outer array and a focal point of the at least one focal point of side outer array, the inner array positioned to receive light passing into the device through at least one lens and reflecting the light out of the device through at least one different lens, the different lens being at least one of the at least two caution-colored lenses. When the autonomous vehicle and the second autonomous vehicle are traveling toward one another in opposite directions and a light beam from the first autonomous vehicle enters an autonomous vehicle dual traffic reflector device and reflects therein to be transmitted in a caution-colored light to the second vehicle, the second vehicle sensor relays angle and distance information to its computer to make necessary lane adjustments to avoid vehicle collision. In some of these embodiments, the lenses could alternatively be clear, or combinations of clear and colored lenses.

In some embodiments of the present invention system, the plurality of autonomous vehicle include a computer that, at least in part, travels in conjunction with a satellite GPS guidance system in coordination with the autonomous vehicle dual traffic reflector detector system.

In some embodiments of the present invention system, the plurality of autonomous vehicle dual traffic reflector devices is located in a predetermined pattern.

In some embodiments of the present invention system, the arcuate arrangement is selected from the group consisting of closed loop and open loop.

In some embodiments of the present invention system, the arcuate arrangement is selected from the group consisting of sinusoidal, arc of fixed radius, arc of varying radius, circle and polygon.

In some embodiments of the present invention system, there are at least four lenses, each being in a different plane from the others.

In some embodiments of the present invention system, there are at least three reflectors in the inner array, each in a different plane from the others.

In some embodiments of the present invention system, there are four to twelve reflectors in the inner array, each in a different plane from the others.

In some embodiments of the present invention system, the reflectors are flat reflectors.

In some embodiments of the present invention system, the reflectors are curved.

In some embodiments of the present invention system, the arcuate arrangement of the outer array is circular and the caution-colored lenses are colored selected from the color group consisting of red, orange, yellow and combinations thereof.

In other embodiments of the present invention, there is an autonomous vehicle dual traffic reflector detector system. It includes: a) a plurality of autonomous vehicles including a first autonomous vehicle and a second autonomous vehicle, each of the plurality of autonomous vehicles having a forward projecting light that includes vectors of light beams directed away from a lane of travel and light receiving sensors that recognize caution-colored light, including angle and distance, and including computer adjustment to lane positioning; b) a plurality of roadways having at least two lanes of travel, including a first lane for travel in a first direction and a second lane for travel in a second direction, the second direction being opposite the first direction, the roadways further including side areas outside of the first lane and the second lane; c) a plurality of autonomous vehicle dual traffic reflector devices for detecting a second the autonomous vehicle by the first autonomous vehicle located along the side areas of the plurality of roadways wherein each of the devices include: (i) an outer array, the outer array having a plurality of light receiving-light transmitting lens, the outer array positioned in an arcuate arrangement having at least one focal point and the outer array having at least two caution-colored lenses; (ii) an inner array with a plurality of reflector panels positioned inside the outer array and between the outer array and a focal point of the at least one focal point of side outer array, the inner array positioned to receive light passing into the device through at least one lens and reflecting the light out of the device through at least one different lens. When the first autonomous vehicle and the second autonomous vehicle are traveling toward one another in opposite directions and a light beam from the first autonomous vehicle enters an autonomous vehicle dual traffic reflector device and reflects therein to be transmitted in a reflected light to the second vehicle, the second vehicle sensor relays angle and distance information to its computer to make necessary lane adjustments and other possible adjustments, such as acceleration, deceleration, and/or stopping, to avoid vehicle collision.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS(S)

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE EMBODIMENTS

Figure 1:
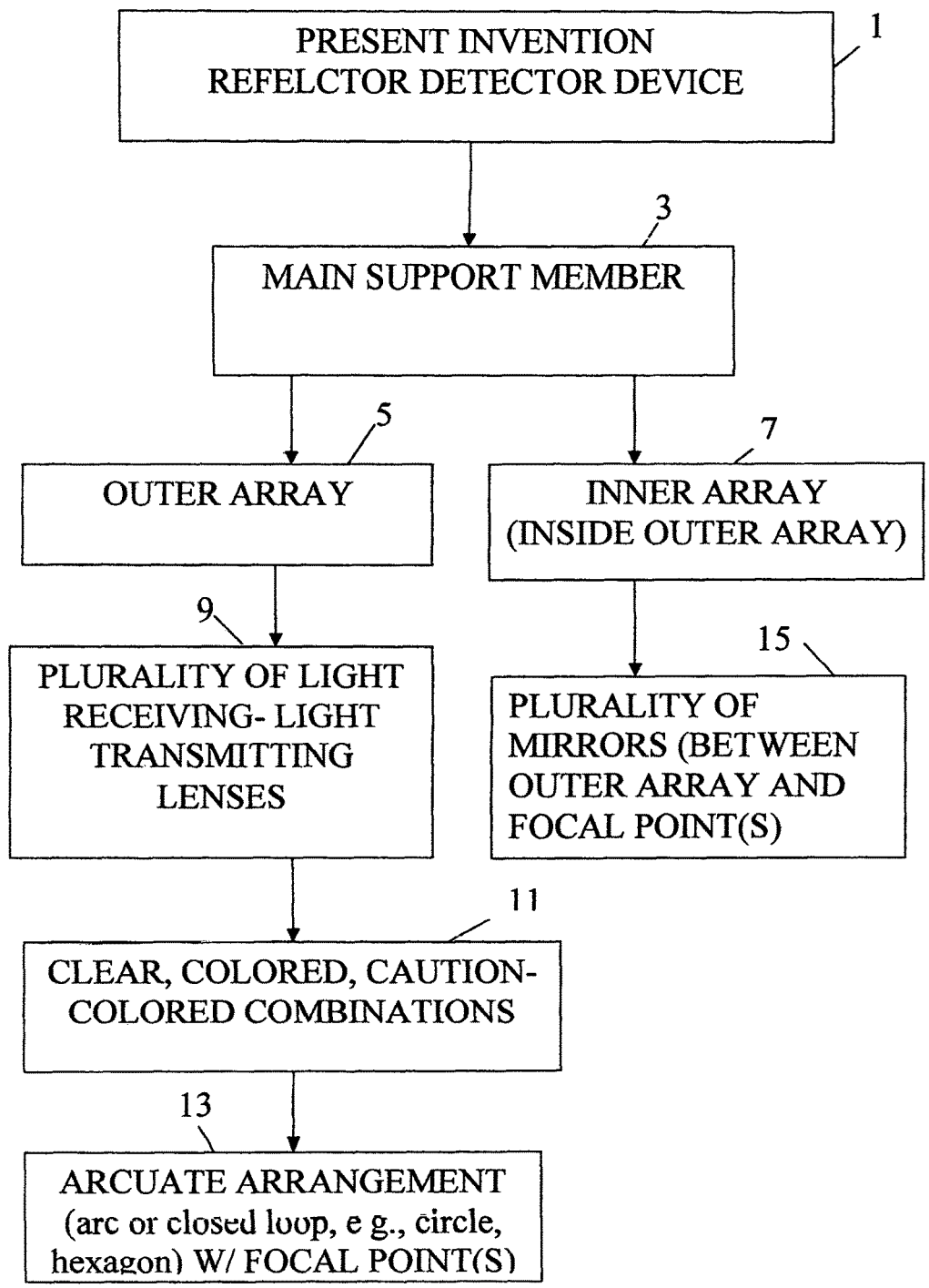
FIG. 1 shows a block diagram of various aspects of a present invention reflector detector device.

The present invention devices and systems are more fully understood by the following examples in conjunction with this detailed description of the drawings. The present invention autonomous vehicle dual traffic reflector device has been developed for many purposes and especially for detecting a second vehicle by a first vehicle. The term "autonomous" should be broadly interpreted as used herein, and thus encompasses completely autonomous vehicles, partially autonomous vehicles, and vehicles with an auto pilot type of functionality. The term "vehicle" as used herein should be broadly interpreted and includes, but is not limited to, single and multiple passenger vehicles, motorcycles, automobiles, trucks, buses, watercraft, such as jet skis, boats and barges, snowmobiles, off road vehicles, ground travelling planes (such as runway taxiing), and military and commercial vehicles.

The autonomous vehicle dual traffic reflector devices of the present invention are installed in vehicles to operate either; (1) with on-board computers that already in place for guidance and/or other systems; (2) with their own dedicated modules; or (3) a combined connected set of both of the foregoing. As with any on-board computer, some form of power is a given—battery, solar, fuel cell, other, hybrids. For simplicity, the functional computer or computer part(s) that operates, sends signal, receives signal, integrates and makes travel adjustments, shall be referred to as the reflector guidance module, to encompass all of (1) with on-board computers that already in place for guidance and/or other systems; (2) with their own dedicated modules; or (3) a combined connected set of both of the foregoing. Thus, the first vehicle sends out a light signal (again broadly interpreted, as this light may be visible, invisible, or combinations thereof). That light signal does two different things when it arrives at the autonomous vehicle dual traffic reflector device. It splits so that part of it (1) travels to an oncoming second vehicle, if any; (2) travels back to the (sending) first vehicle to enhance its position recognition when used in conjunction with GPS or other primary location information. An oncoming second vehicle with its own reflector guidance module, when it receives the sent signal, will intake the signal, recognize its source (the present invention fixed location autonomous vehicle dual traffic reflector device), enhance (fine tune) its own location when used in conjunction with GPS or other primary location information, and make travel adjusts where necessary to avoid collision or close encounters with the first vehicle.

In some embodiments, a visible colored light source, or an infrared or other invisible light source emitting from a first autonomous vehicle reflects back to that first autonomous vehicle to be noticed by the first autonomous vehicle or semi-autonomous vehicle locking in its accurate location to be signaled to a second autonomous vehicle operating more accurately to travel in a preferred safe path or road, not to be diverted, as if on a virtual rail system. In some refined embodiments, a signal sent from the first autonomous vehicle using the present invention dual traffic reflector detector system will be based on the set reflector angles and thus set a predetermined distance ahead of the first semi-autonomous or autonomous vehicle, to signal oncoming traffic ahead of its approach to make accurate onboard autonomous vehicle corrections if needed, included wheel turning adjustment(s), slowing down, accelerating, or even braking and stopping completely.

The autonomous vehicle dual traffic reflector devices of the present invention are advantageously and readily utilized at night, but are also adapted for daylight use. This daytime use may be accomplished by deeply recessed reflector panels within the devices or may be accomplished with various shields, such as an enlarged top cap with overhang to avoid most sunlight entering the devices. Alternatively, the lens, reflectors and receptors may be designed for discriminating reflected light signals in daylight with ultra-sensitive accuracy. In some embodiments, the lenses could be caution-colored, colored, clear, or combinations of clear and any colored lenses.

The autonomous vehicle dual traffic reflector devices of the present invention have reflector panels that may be flat or curved, and, in some cases, are compound, so that a single panel may reflect light in different directions and/or split the light so as to partially return some of the light back to its source. This may be achieved by using panels having diverse areas such as a panel with flat areas and with parabolic areas (for return reflection), or a panel with flat areas and reflective reverse pyramids. Other means for light splitting and partial advance/partial return reflection that are known to the artisan may be utilized in the alternative.

FIG. 1 shows a block diagram of various features of the present invention Reflector Detector Device 1. There is a main support member 3 for holding outer array 5 and inner array 7. Outer array 5 has a plurality of light receiving-light transmitting lenses 9, which may be clear colored, caution colored, other colors or combinations thereof. The combinations of clear and cautionary color lenses are preferred. Outer array 5 has its lenses 9 arranged in an arc or a continuous loop 13 with at least one focal point. The term "arc" as used herein should be broadly construed, such that broken or connected line segments (straight at a series of angles (like a top view of a part of a hexagon or other polygon) or curved line(s)) create a part of a loop. "Closed loop" as used herein means a continuous or continual series of parts that begin and end at the same point. Thus, a circle of parts (lenses or lenses with main support member parts between the lens) is one example of a closed loop, as would be an oval, an irregular circle, any regular or irregular polygon. Also shown in FIG. 1 is inner array 7 which is located inside outer array 5 and between outer array lenses 9 and the focal point(s) 13. Inner array 7 is a collection of mirrors with open spaces or clear parts there between. This allows some light to reflect and some to pass through to increase the possibilities of multiple sensings and/or multiple reflections. In some instances, part of the light may travel to a second present invention device and be further dispersed and then sensed from that second device.

Figure 2:
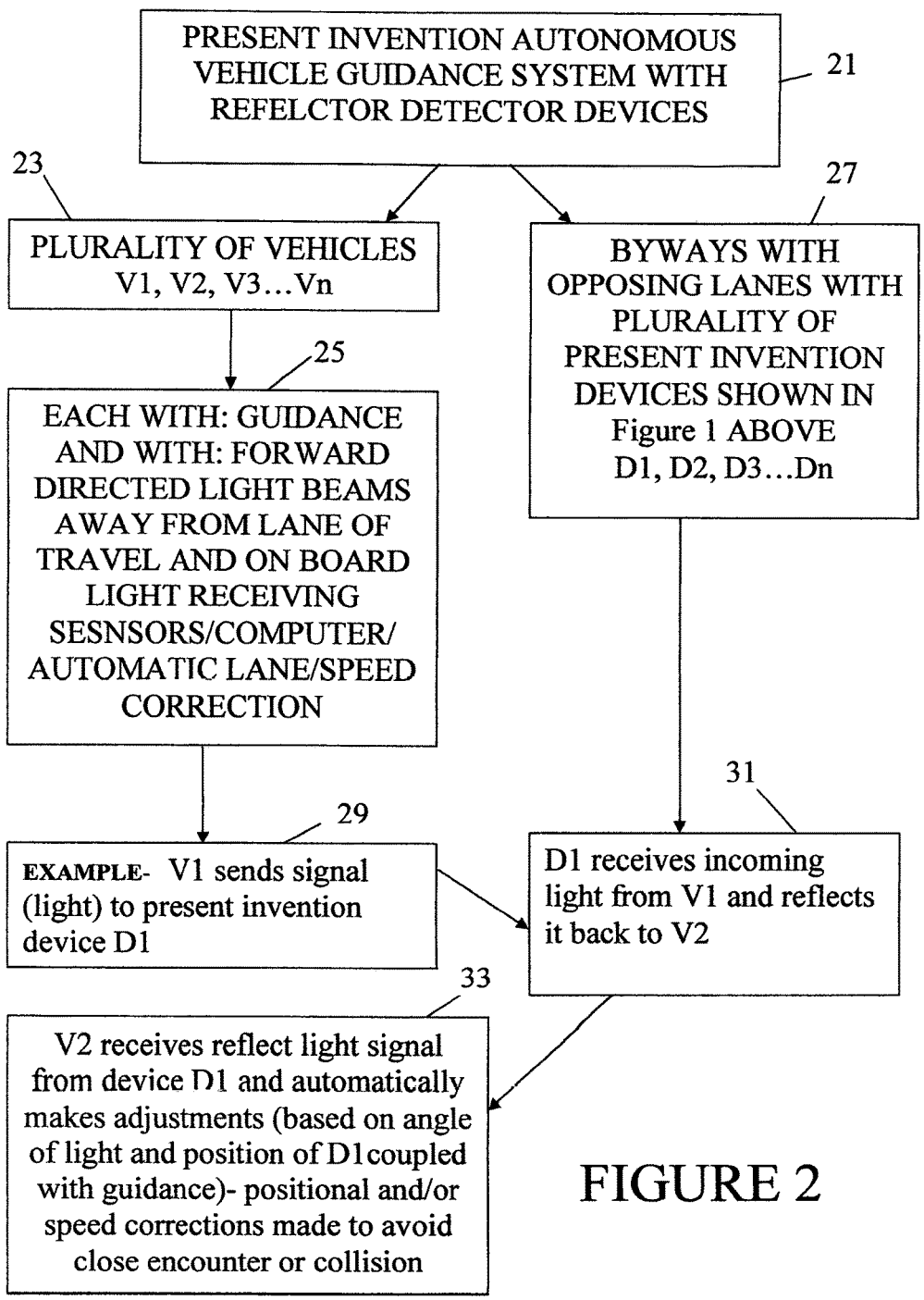
FIG. 2 shows a block diagram of various aspects of a present invention autonomous vehicle guidance system using a present invention reflector detector devices.

FIG. 2 shows a block diagram of various aspects of a present invention autonomous vehicle guidance system 21 using present invention reflector detector devices on byways 27 with a plurality of the present invention devices shown in FIG. 1. The term "autonomous" is used throughout this document and is taken to mean any vehicle that is driven by an automated system, either temporarily or permanently, with or without a (backup) person as a driver. The system 21 includes a plurality of vehicles 23 on the byways, such as V1, V2, V3 . . . to Vn, where n is any number larger than 3. Each of these vehicles 23 includes guidance (as in conventional existing autonomous vehicles with GPS or similar systems), and includes light beams directed away from the lane of travel, as well as onboard light-receiving sensors, and computer control module that receives, interprets and acts upon the receive information (reflected light angle and device location) to correct the movement of the vehicle, as needed to avoid a collision or near miss, by automatic speed and lane correction 25. As an example, V1 sends a light signal 29 to device D1, which receives the incoming light from V1 and reflects it 31 back to V2. V2 receives that signal and automatically makes adjustment as needed 33. Not shown, but likely, is light from V2 also passes through D1 and is received by V1 for action as needed.

Figure 3:
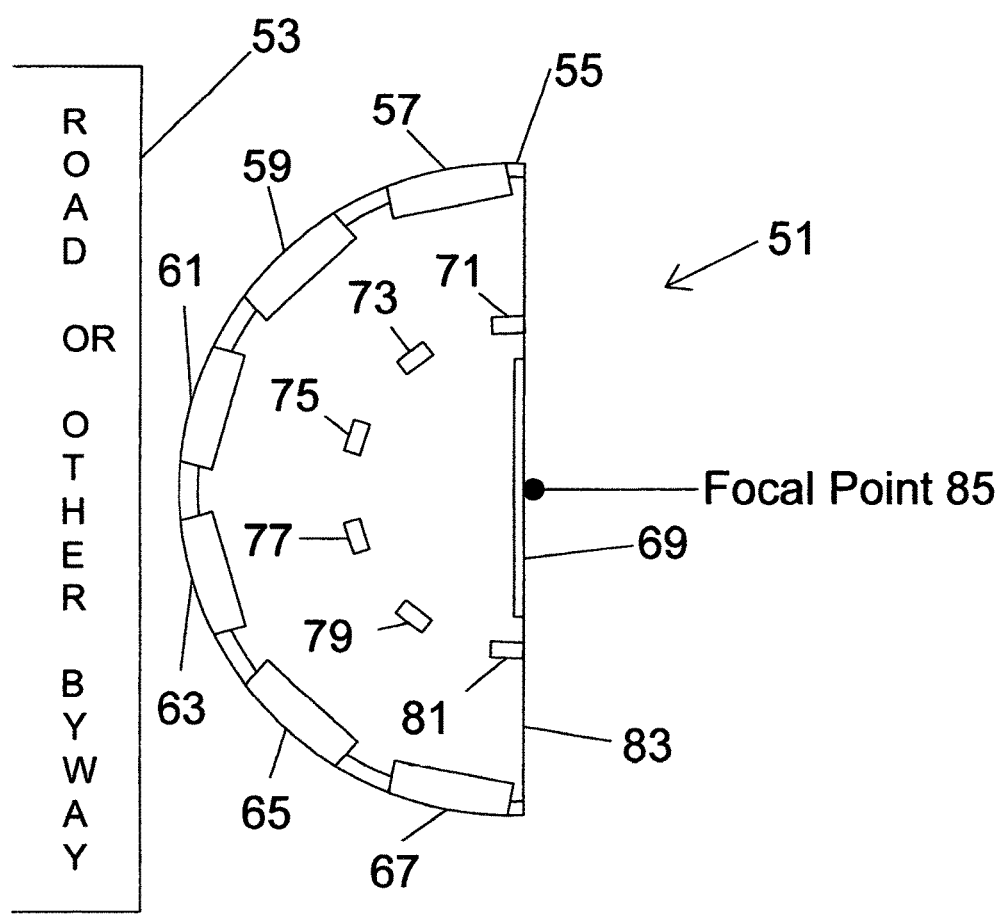
FIG. 3 shows a top view of an embodiment of a present invention reflector detector device having an open loop top view configuration.

FIG. 3 shows a top view of an embodiment of a present invention reflector detector device having 51 an open loop top view configuration. There is a road or byway 53. "Byway" can be any surface upon which vehicles are driven, highways, streets, lanes, back roads, off road pathways, runways, plane taxiways, boat channels, tunnels, military movements, etc. The present invention system is especially beneficial in tunnels and other byways where GPS systems may be blocked, such as underground garages, canopied drive-thrus, cliff overhangs, heavy overhead foliage, over/under roadways, and under bridges.

The present invention device 51 has a support structure 83 that may be a single or a multi-component support member, such as metal or plastic or rigid foam or other structure that can withstand outdoor weather, as well as combinations thereof. The structure may be mounted on a post, attached to a pole or suspended, depending upon the availability of existing sub-support members at its installed location. It would be reasonable to permanently attach it to a roadside via a post and footing, but if an existing pole or other available existing structure is present, it could be mounted to that existing structure. And, for example, if roadside overhead structures exist, suspension therefrom of present invention device is also possible. Outer array 55 is a half circle in this embodiment, and has a focal point 85. The outer array 55 includes clear lenses and here, has no cautionary colored lenses, but additional embodiments described below do have cautionary colored lenses. In this outer array 55, the lenses are shown as lens 57, 59, 61, 63, 65 and 67. Inner array is comprised of separated stand-up reflectors 71, 73, 75, 77, 79 and 81 arranged in an arc between the outer array 55 and focal point 85. They are strategically positioned to receive light from oncoming vehicles and reflect it to a second vehicle, as described above and below.

Figure 4:
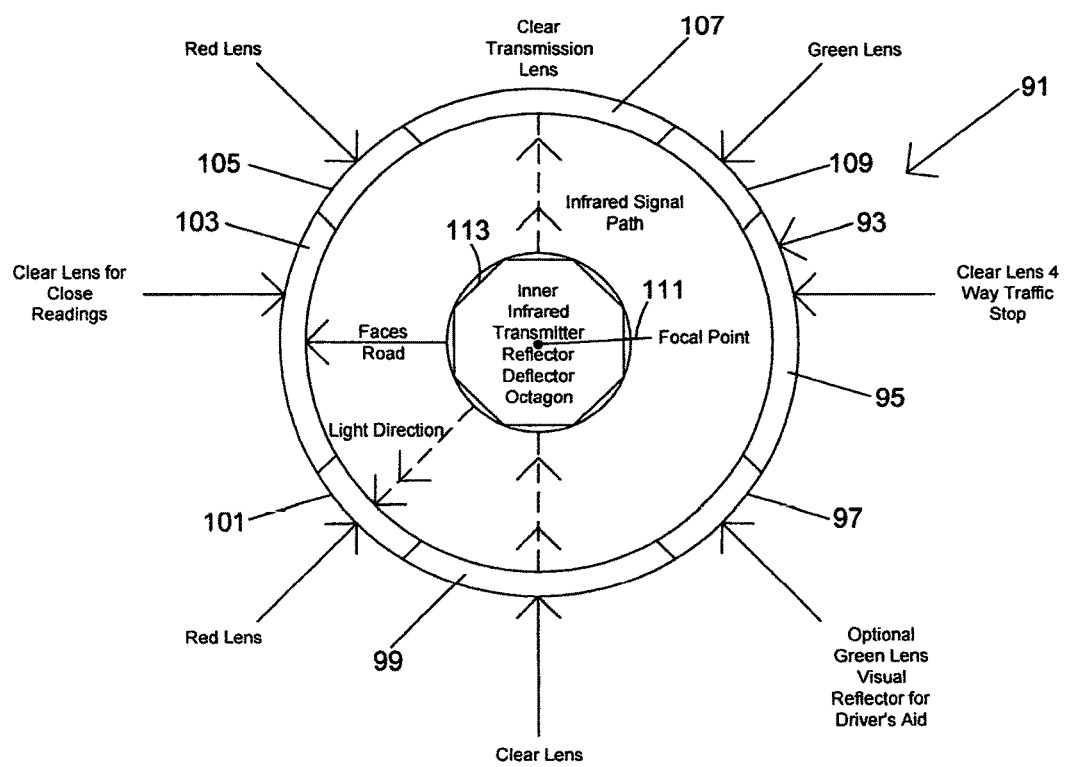
FIG. 4 shows a top view of an embodiment of a present invention reflector detector device having an closed loop top view configuration.

FIG. 4 shows a top view of an embodiment of a present invention reflector detector device having an closed loop top view configuration 91. It includes a main support structure 93, which may have a general configuration like a round cookie tin with a sealed top. Various lenses are included, and are colored or not, as indicated in the drawing. These lenses include lenses 95, 97, 99, 101, 103, 105, 107 and 109, with focal point 111. This device 91 may be beneficial for intersections as well as roadside uses as it has universal angles. Inner array 113 has a plurality of reflective mirrors arranged in an inner circle and may have facets with reflective and clear sections to enhance light transference.

Figure 5:
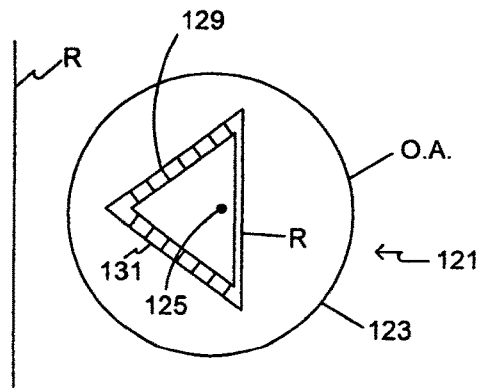
FIG. 5 shows a top view of an embodiment of a present invention reflector detector device having a circular top view configuration.

FIG. 5 shows a top view of an embodiment of a present invention reflector detector device 121 having a circular top view outer configuration 123 for its outer array of lenses, and a triangular inner array having road R facing back side 127 with a solid continuous inside mirror surface, and two angled sides 129 and 131 with alternating mirror and clear or open areas, to enhance receiving and reflecting light sensing.

Figure 6:
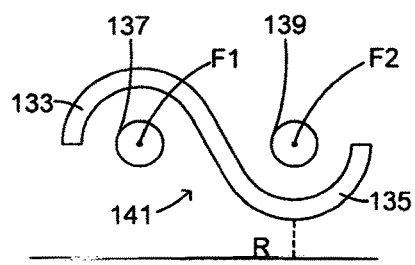
FIG. 6 shows a top view of an embodiment of a present invention reflector detector device having a sinusoidal top view configuration.

FIG. 6 shows a top view of an embodiment of a present invention reflector detector device 141 having a sinusoidal top view configuration. This present invention device has one outer array that is sinusoidal and has two halves and two different inner arrays The first half 133 has a focal point F1 and operates in conjunction with reflective inner array 137, which preferably has mirror and clear segments; the second half 135 operates in conjunction with second inner array 139 with similar mirror and clear segments as array 137. This unusual configuration may be useful anywhere, but especially on road segments in the form of doglegs, s curves and U-shaped curves.

Figure 7:
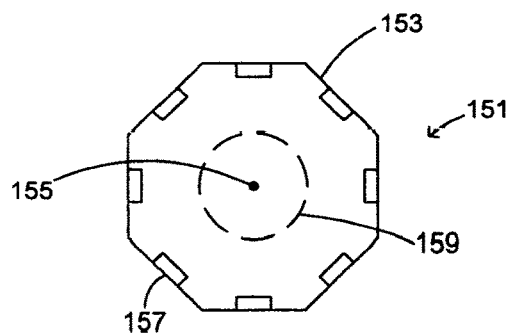
FIG. 7 shows a top view of an embodiment of a present invention reflector detector device having a polygonal top view configuration.

FIG. 7 shows a top view of an embodiment of a present invention reflector detector device 151 having a polygonal top view configuration with an outer array 153 with a plurality of lenses such as lens 157, which may be any combination of colors/clear, as described above. The inner array 159 is inside outer array 153 and outside focal point 155. The inner array 159 may have any of the above-described configurations, lenses shapes and positions.

Figure 8:
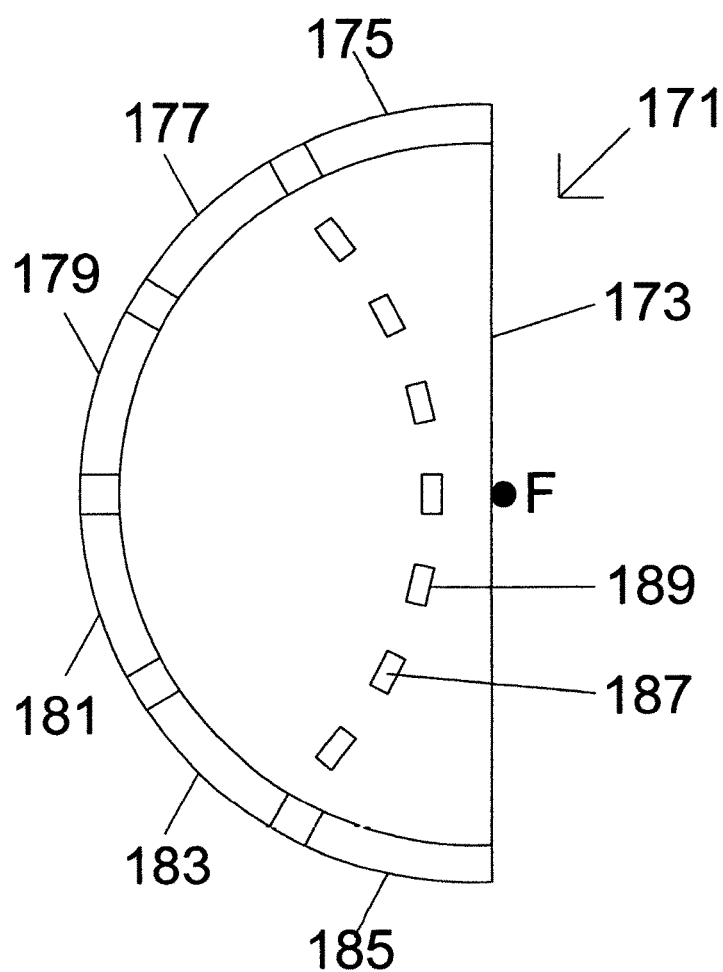
FIG. 8 shows a top view of an embodiment of a present invention reflector detector device having an arc of a fixed radius top view configuration.

FIG. 8 shows a top view of an embodiment of a present invention reflector detector device 171 having an outer array 175 and an arc of a fixed radius with focal point F, and with a reverse (facing opposite direction) directed inner array arc made up of a plurality of reflective mirrors, such as mirrors 187 and 189. The spaces between the mirrors may allow light to hit the back of support structure 173, which also may optionally be a mirrored surface. Outer array 175 has a plurality of lenses 177, 179, 181, 183 and 185.

Figure 9:
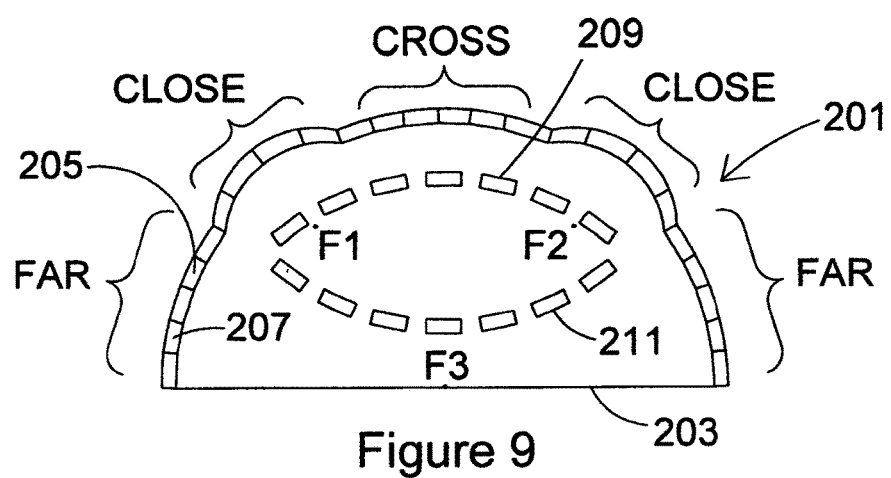
FIG. 9 shows a top view of an embodiment of a present invention reflector detector device having an arc of varying radius top view configuration.

FIG. 9 shows a top view of an embodiment of a present invention reflector detector device 201 with support structure 203, outer array 205 and inner array 211 with two sided mirrors such as mirror 209. In this configuration, the outer array has at least two focal points including F1, F2 and F3. Inner array 211 is positioned between focal point F3 and outer array 205. As can be seen, parts of the outer array are based on large radii (not shown) emanating from focal point F3 to receive light from relatively far distances at its sides and right angle lights at its fronts. In between are small radius arcs emanating from focal points F1 and F2 to receive light from relatively close sources.

Figure 10:
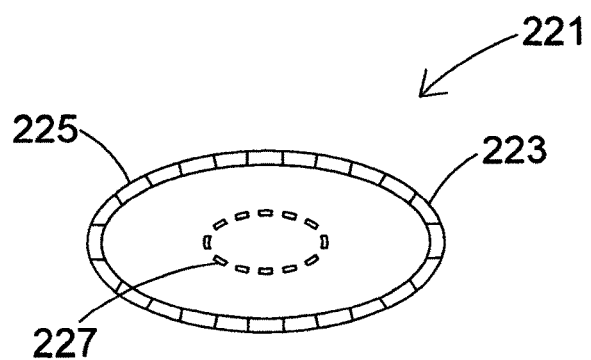
FIG. 10 shows a top view of an embodiment of a present invention reflector detector device having a oval top view configuration.

FIG. 10 shows a top view of an embodiment of a present invention reflector detector device 221 having a oval top view configuration. It includes outer array 223 with multiple, diverse lenses such as lens 225. Inner array 227 with reflective mirrors is likewise oval in shape and may utilize any individual mirrors spacings such as described above.

Figure 11:
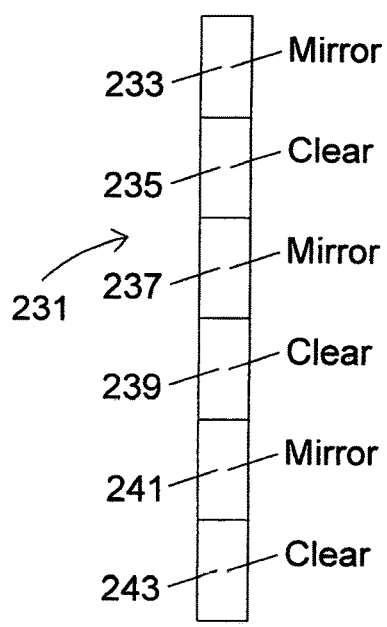
FIGS. 11 and 12 illustrate different reflector shapes.
Figure 12:
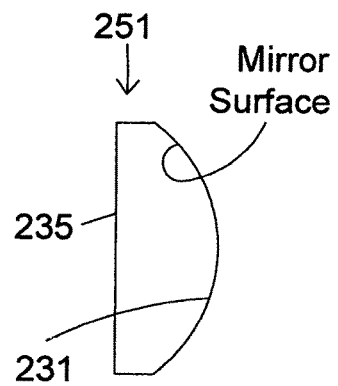

FIGS. 11 and 12 illustrate different reflector shapes. In FIG. 11, a lens 231 has segments of alternating reflective and clears surfaces. Specifically, segments 233, 237 and 241 are mirrored or as segments 235, 239 and 243 are clear. FIG. 12 shows reflective mirror 221 with a flat outer surface 255 and a concave surface 253 so as to capture incoming light and reflect that incoming light from many more angles than a flat surface might successfully reflect from a first vehicle to another vehicle.

Figure 13:
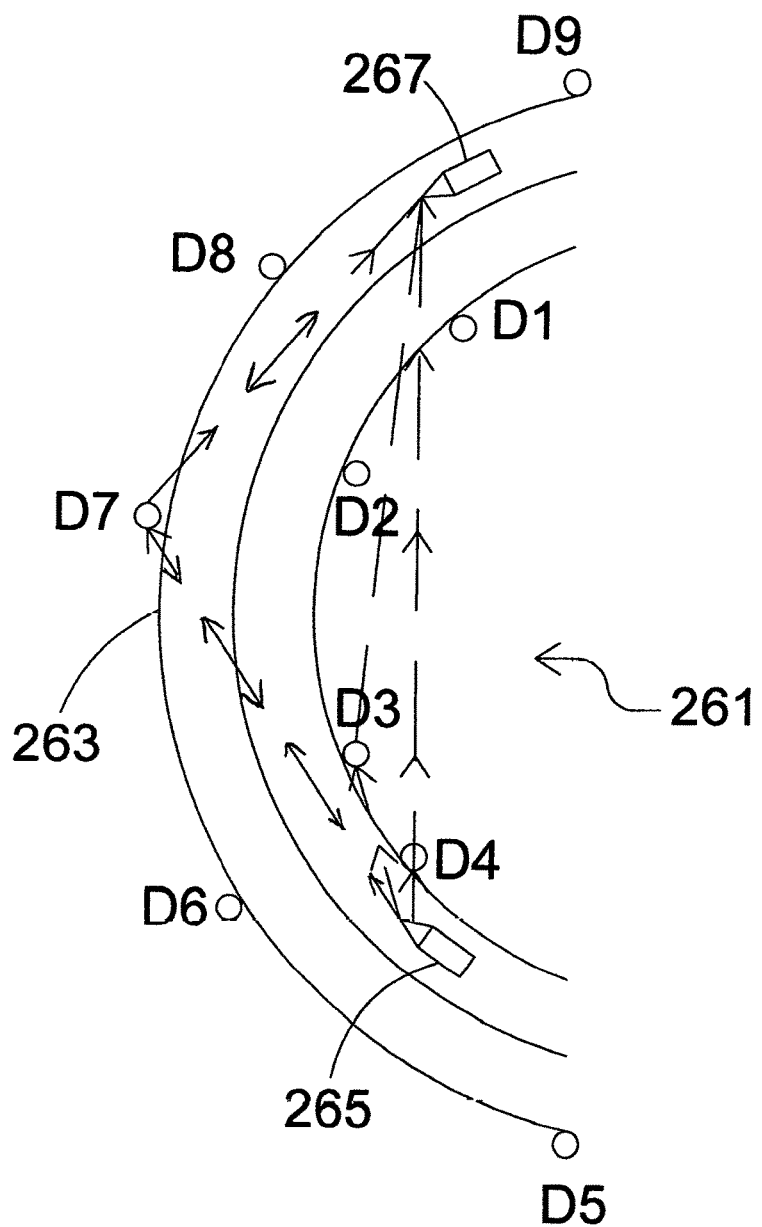
FIGS. 13 and 14 show top views of a system with different scenarios of opposing autonomous vehicles approaching one another with present invention reflector detector devices assisting in travel guidance.
Figure 14:
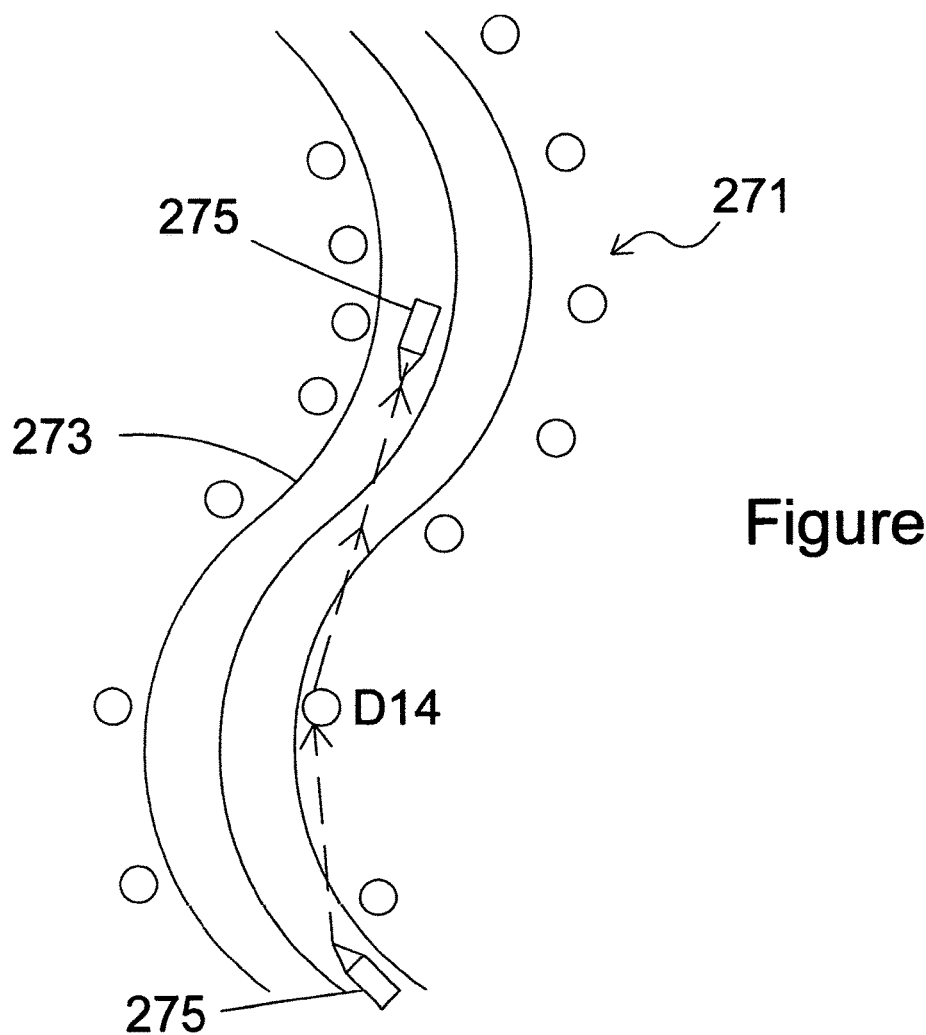

FIGS. 13 and 14 show top views of a system with different scenarios of opposing autonomous vehicles approaching one another with present invention reflector detector devices assisting in travel guidance. FIG. 13 shows a top view of one scenario around a sharp curve on road way 263 wherein vehicle 265 and vehicle 267 are approaching one another from opposite directions but cannot see each other. The road way 263 has present invention vises D1 through D9. Light emanating from vehicle 265 may be received by devices D3, D4 and D7 and that light will reflect back to vehicle 267 as a warning and as a supply of information to be relied upon for fine tuning lane positioning and collision avoidance. The present invention devices may specifically be any such present invention devices as contemplated by the description herein paragraph. FIG. 14 shows a present invention system 271 with an S-shaped road way 273 and a plurality of present invention devices including one designated as D14. Light emanating from vehicle 275 traveling northward is received by device D14 and reflected to vehicle 277 traveling south toward vehicle 275. This information will be updated as the vehicles drive closer to each other in a sense that more transmitted (reflected) light at closer angles will provide additional information for the guidance systems to use for lane maintenance and collision avoidance. While FIG. 14 shows light coming from vehicle 275 that is received by vehicle 277, in general, the opposite will also occur. In other words, light will also emanate from vehicle 277 and be reflected to vehicle 275 to provide additional data for guidance of autonomous vehicle 275. Additionally, FIG. 14 is simplified in that only one present invention device is shown receiving and reflecting light with the arrows showing one direction. In reality, multiple devices on side of the road at different or at the same time will be receiving light and reflecting light in one or both directions to further significantly fine tune each vehicles guidance toward and past one another. The left-most set of arrows in FIG. 13, thus, has arrowheads showing light paths traveling in both directions.

Figure 15:
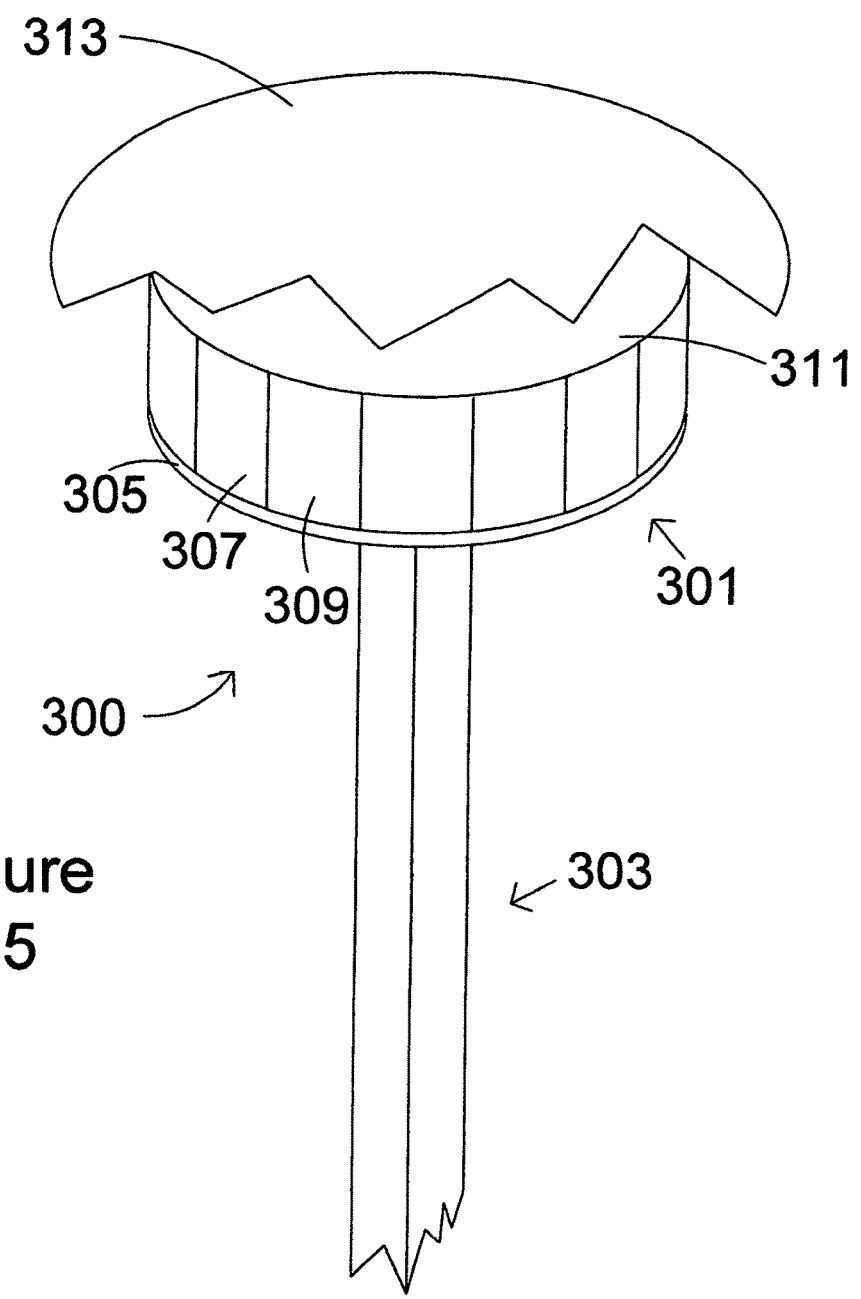
FIG. 15 shows front oblique view of a present invention device with 360 degree surround rectangular lenses, to maximize use of incoming and outgoing light signals; and, FIG. 16 shows a front view of a stacked arrangement of present invention reflector detector devices, including diverse shielding sections, particularly useful for four way, partially or fully obscured, intersections.

FIG. 15 shows front oblique view of a present invention installed device 300, with reflector detector device 301 with placement stand 303. The placement stand 303 may be any permanent or temporary stand, such as are used for permanent mile markers, signs and mailboxes, or temporary road signs (sometimes with a single pole but a criss-cross or extended legs base). Present invention reflector detector device 301 has 360 degree surround rectangular lenses, such as lenses 305, 307 and 309 and, above its top 311 is a weather shield 313. (These lenses may be combinations of any described above, and in semi-autonomous uses, the cautionary colors of red and orange are particularly beneficial). As can be seen, the rectangular shaped lenses take up almost all of the space, except for thin supports, and thus maximize use of incoming and return of outgoing light signals.

Figure 16:
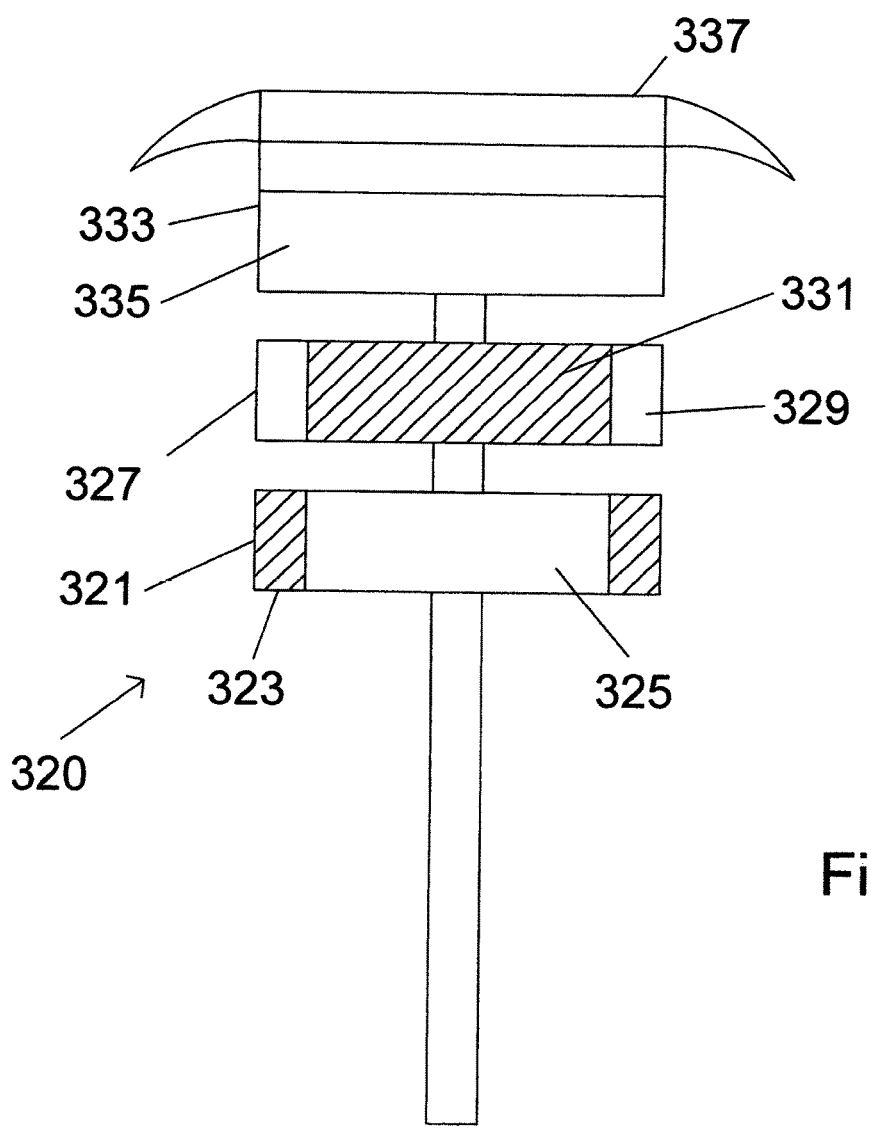

FIG. 16 shows a front view of a stacked arrangement 320 of present invention reflector detector devices 321, 327 and 333. These have diverse shielding sections, particularly useful for four way, partially or fully obscured, intersections. Device 321 has East and West shields, such as shield 323, with an array of lenses shown generally as lens area 325. Device 327 has East and West shields, such as shield 331, with an array of lenses, such as is shown generally as lens area 329. Device 333 has no shields and a full lens area 335, with weather shield 337 atop it.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, the actual shape of the main housing may be any of numerous possibilities as long as its functionality as described is not affected adversely. Also, as another example, the lenses may have identifying features such as binary number stenciling or template features, or barcodes, QR codes, reference numbers and/or letters, or any other indentifying symbols.

What is claimed is:

1. An autonomous vehicle dual traffic reflector detector guidance system, which comprises:
   a) a plurality of autonomous vehicles including a first autonomous vehicle and a second autonomous vehicle, each of said plurality of autonomous vehicles having a forward projecting light that includes vectors of light beams directed away from a lane of travel and light receiving sensors that recognize caution-colored light, including angle and distance, and including computer adjustment to lane positioning;
   b) a plurality of roadways having at least two lanes of travel, including a first lane for travel in a first direction and a second lane for travel in a second direction, said second direction being opposite said first direction, said roadways further including side areas outside of said first lane and said second lane;
   c) a plurality of autonomous vehicle dual traffic reflector devices for detecting said second autonomous vehicle by said first autonomous vehicle located along said side areas of said plurality of roadways wherein each of said devices include:
      (i) an outer array, said outer array having a plurality of light receiving-light transmitting lens, said outer array positioned in an arcuate arrangement having at least one focal point and said outer array having at least two lenses selected from the group consisting of caution-colored lenses, colored lenses, clear lenses and combinations thereof;
      (ii) an inner array of reflective mirrors positioned inside said outer array and between said outer array and a focal point of said at least one focal point of said outer array, said inner array positioned to receive light passing into said device through at least one lens and reflecting said light out of said device through at least one different lens, said different lens being at least one of said at least two lenses;
   whereas when said first autonomous vehicle and said second autonomous vehicle are traveling toward one another in opposite directions and a light beam from said first autonomous vehicle enters an autonomous vehicle dual traffic reflector device and reflects therein to be transmitted in a recognized light to said second vehicle, said second vehicle sensor relays angle and distance information to its computer to make necessary lane adjustments to avoid vehicle collision.

2. The system of claim 1 wherein said plurality of autonomous vehicles include a computer that, at least in part, travels in conjunction with a satellite GPS guidance system in coordination with said autonomous vehicle dual traffic reflector detector system.

3. The system of claim 2 wherein said plurality of autonomous vehicle dual traffic reflector devices are located in a predetermined pattern.

4. The system of claim 1 wherein said arcuate arrangement is selected from the group consisting of closed loop and open loop.

5. The system of claim 1 wherein said arcuate arrangement is selected from the group consisting of sinusoidal, arc of fixed radius, arc of varying radius, circle and polygon.

6. The system of claim 1 wherein there are at least four lenses, each being in a different plane from the others.

7. The system of claim 1 wherein there are at least three reflectors in said inner array, each in a different plane from the others.

8. The system of claim 1 wherein there are four to twelve reflectors in said inner array, each in a different plane from the others.

9. The system of claim 1 wherein said reflectors are flat reflectors.

10. The system of claim 1 wherein said reflectors are curved.

11. The system of claim 1 wherein said arcuate arrangement of said outer array is circular and said caution-colored lenses are colored selected from the color group consisting of red, orange, yellow and combinations thereof.

12. An autonomous vehicle dual traffic reflector device for detecting a second vehicle by a first vehicle, which comprises:
   a) an outer array, said outer array having a plurality of light receiving-light transmitting lens, said outer array positioned in an arcuate arrangement having at least one focal point and said outer array having at least two lenses selected from the group consisting of caution-colored lenses, colored lenses, clear lenses and combinations thereof;
   b) an inner array of reflective mirrors positioned inside said outer array and between said outer array and a focal point of said at least one focal point of said outer array, said inner array positioned to receive light passing into said device through at least one lens and reflecting said light out of said device through at least one different lens, said different lens being at least one of said at least two lenses, said inner array of reflective mirrors being selected from the group consisting of: (i) a plurality of separate mirrors positioned in different planes relative to one another; and (ii) at least one mirror having a top view compound shape.

13. The reflector device of claim 12 wherein said arcuate arrangement is selected from the group consisting of closed loop and open loop.

14. The reflector device of claim 12 wherein said arcuate arrangement is selected from the group consisting of sinusoidal, arc of fixed radius, arc of varying radius, circle and polygon.

15. The reflector device of claim 12 wherein there are at least four lenses, each being in a different plane from the others.

16. The reflector device of claim 12 wherein there are at least three reflectors in said inner array, each in a different plane from the others.

17. The reflector device of claim 16 wherein there are four to twelve reflectors in said inner array, each in a different plane from the others.

18. The reflector device of claim 16 wherein said reflectors are flat reflectors.

19. The reflector device of claim 12 wherein said reflectors are curved.

20. The reflector device of claim 12 wherein said arcuate arrangement of said outer array is circular and said caution-colored lenses are colored selected from the color group consisting of red, orange, yellow and combinations thereof.

* * * * *